United States Patent
Virolainen et al.

(10) Patent No.: US 10,467,722 B2
(45) Date of Patent: *Nov. 5, 2019

(54) COMBINED RENDERING AND COMPUTING RESOURCE ALLOCATION MANAGEMENT SYSTEM

(71) Applicant: Basemark Oy, Helsinki (FI)

(72) Inventors: Teemu Virolainen, Helsinki (FI); Mikko Alaluusua, Helsinki (FI); Arto Ruotsalainen, Helsinki (FI)

(73) Assignee: Basemark OY, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,326

(22) Filed: Nov. 6, 2017

(65) Prior Publication Data

US 2019/0139181 A1    May 9, 2019

(51) Int. Cl.
| | |
|---|---|
| *G06F 8/41* | (2018.01) |
| *G06T 15/00* | (2011.01) |
| *G06F 9/54* | (2006.01) |
| *G06T 1/20* | (2006.01) |
| *G06F 9/50* | (2006.01) |
| *G06T 1/60* | (2006.01) |

(52) U.S. Cl.
CPC ............... *G06T 1/20* (2013.01); *G06F 8/433* (2013.01); *G06F 9/5016* (2013.01); *G06F 9/54* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,692,193 | A * | 11/1997 | Jagannathan | G06F 8/451 711/6 |
| 6,496,190 | B1 * | 12/2002 | Driemeyer | G06T 15/005 345/619 |
| 8,555,035 | B1 * | 10/2013 | Patney | G06F 8/441 712/216 |
| 9,824,488 | B2 * | 11/2017 | Viswanathan | G06T 15/80 |
| 2005/0289499 | A1 * | 12/2005 | Ogawa | G06F 17/5045 716/104 |
| 2007/0097138 | A1 * | 5/2007 | Sorotokin | G06F 17/2247 345/581 |

(Continued)

*Primary Examiner* — Joni Richer
(74) *Attorney, Agent, or Firm* — Jacob Eisenberg (57) ABSTRACT

Described herein is a method for allocating resources of a graphics processing unit (GPU). Methods as described herein can include assembling a plurality of work nodes having defined inputs and outputs, wherein at least one work node is a rendering work node and at least one work node is a compute work node. A schedule can be created for the plurality of work nodes based at least on the defined inputs and outputs, wherein the plurality of work nodes can be scheduled such that more than one GPU process can be carried out at a point in time. Additionally, the schedule can be created such that both render nodes and compute nodes can use the same GPU resources either simultaneously or at separate times. For example, the GPU does not need to be partitioned where certain resources are only for compute processes and others are reserved for rendering processes. A set of system resource barriers can be determined for processing the set of work nodes based on the created schedule.

17 Claims, 4 Drawing Sheets

(56) References Cited

U.S. PATENT DOCUMENTS

| | | | |
|---|---|---|---|
| 2011/0102441 A1* | 5/2011 | Rapp | G06F 8/433 |
| | | | 345/440 |
| 2016/0077896 A1* | 3/2016 | Bolz | G06F 9/54 |
| | | | 719/328 |
| 2016/0093012 A1* | 3/2016 | Rao | G06T 1/20 |
| | | | 345/522 |
| 2016/0307353 A1* | 10/2016 | Ligenza | G06T 13/20 |

* cited by examiner

Fig. 5

US 10,467,722 B2

COMBINED RENDERING AND COMPUTING RESOURCE ALLOCATION MANAGEMENT SYSTEM

FIELD OF INVENTION

The present invention relates to the field of visualization and rendering. In particular, the system deals with work load balancing in a GPU.

BACKGROUND OF INVENTION

With current graphics engines resource allocation is not optimized for individual use cases, they essentially use pool memory which is use-case independent. For example, in an entertainment graphics engine some resources can be permanently allocated for rendering explosions regardless if there are any explosions in a given rendering set. As such, these resources may go to waste during large portions of gaming use and virtually always in, for example, industrial uses.

Additionally, current engines often hide their resource allocation so that it's hard to determine if certain operations results in new allocations.

Furthermore, to avoid having combinatorial explosion between algorithms configurations, certain resources are redundantly allocated. For example, one algorithm might need some temporary texture for intermediate results, but the texture is not needed after the algorithm completes, however, the texture is then kept just for that algorithm and is not accessible for other portions of the rendering pipeline thereby needlessly using system memory resources. Therefore, in current graphics engines this texture cannot be reused in a later stage or a different stage of the rendering pipeline.

A major problem created by current graphics engines system resource allocation is a high degree of memory fragmentation. Due to this, and on many other well known reasons in the art, current graphics engines are not well suited for safety critical environments.

Furthermore, Graphics Processing Units (GPUs) often have a problem where rendering processes and computing processes fight for the same resources. When this happens there can arise a block or inefficiencies where one or both sets of processes are unnecessarily slowed down. Therefore, there exists a need for balancing the work load in a GPU between rendering tasks and computing tasks.

SUMMARY OF THE INVENTION

Described herein is a method for allocating resources of a graphics processing unit (GPU). Methods as described herein can include assembling a plurality of work nodes having defined inputs and outputs, wherein at least one work node is a rendering work node and at least one work node is a compute work node.

A schedule can be created for the plurality of work nodes based at least on the defined inputs and outputs, wherein the plurality of work nodes can be scheduled such that more than one GPU process can be carried out at a point in time. Additionally, the schedule can be created such that both render nodes and compute nodes can use the same GPU resources either simultaneously or at separate times. For example, the GPU does not need to be partitioned where certain resources are only for compute processes and others are reserved for rendering processes.

A set of system resource barriers can be determined for processing the set of work nodes based on the created schedule.

Furthermore, aspects of the present invention allow for more efficiently allocating, utilizing and balancing system resources (memory and processor capacity) for a graphics engine. This applies to rendering, computing and the combination thereof. This allows for better use of a devices resources allowing for either reducing the minimum computing requirements in a device for a given function and/or limiting the demand on resources from the graphics engine thereby freeing up resources for other uses.

Additionally, in safety critical use cases the resource allocation described herein can be pre-defined prior to use in the most efficient manner for the particular required visualization. Prior to use, with the system resource allocation optimized, the system resources can be fixed in their optimized settings so that resources do not need to be re-allocated during use. This therefore enables the use in many safety critical environments.

DETAILED DESCRIPTION OF EXEMPLARY EMBODIMENTS

One method of system resource allocation is defining a rendering algorithm as an independent work unit which handles its own resource allocation. Another method of system resource allocation is defining a rendering algorithm as collection of linked render nodes. In the examples herein, the rendering algorithm is typically the latter as will be discussed in more detail below. However, both methods can be utilized herein.

Each rendering algorithm and/or render node herein can define what it expects as an input and what it outputs. An example of a rendering algorithm can be an opaque rendering algorithm. An example of an input for an opaque rendering algorithm is shadow map data. Additionally, there can be several inputs for a given rendering algorithm. For example, an additional example input would be light data for the opaque rendering algorithm.

Rendering algorithms can be combined into a high level rendering pipeline. A high level rendering pipeline can define a chain of rendering algorithms and/or render nodes which produces a final image. For example, a high level rendering pipeline can include a shadow map generation rendering algorithm, light data calculation rendering algorithm, opaque object rendering algorithm, transparent object rendering algorithm, tonemapping rendering algorithm and depth of field rendering algorithm.

A rendering algorithm itself can be a linked chain of render nodes. Each render node can define what kind of resources it needs as an input, and what kind of resources it outputs. The higher level rendering pipeline can be a compiled chain, list or graph of render nodes. For example, the rendering nodes of different rendering algorithms can be interspersed with each other in the chain of the higher level rendering pipeline. Additionally, the linked chain can have a combination of parallel and series links so that certain render nodes and/or rendering algorithms can be carried out at the same time.

Resources can be the required inputs and outputs of a render node or rendering algorithm. These can include data, data sets, scenes, parameters etc. that go into a rendering process of a render node.

More generally, a rendering algorithm as described herein can be a dedicated process within a rendering pipeline (e.g. a shadow map generation rendering algorithm, light data calculation rendering algorithm, opaque object rendering algorithm, transparent object rendering algorithm, tonemapping rendering algorithm and depth of field rendering algorithm). A rendering algorithm can include only a single rendering node or it can include a plurality of rendering nodes.

A rendering node as described herein can be a process, routine, rendering pass or work unit which has dependencies. E.g. one pass of a shadow rendering algorithm or an orb glow rendering node for an object type. A sub-unit, e.g. a single work unit, of a larger rendering algorithm (e.g. a circle of confusion work unit within a depth of field rendering algorithm)

System resources can be, but are not limited to, GPU memory, CPU memory and processing capacity.

Rendering resources as described herein can be data sets either available to the graphic engine (e.g. textures) or data sets created within a rendering pipeline (e.g. light data from a light data calculation stage), memory cache requirement or processing requirements. Framebuffers System barriers can be, but are not limited to, cache flushing of memory (GPU, CPU, etc.), scheduling orders for when certain render algorithms/ render nodes are to be or can be run, processing requirements for a certain rendering node/rendering algorithm or set thereof, indication of which rendering nodes/rendering algorithms are dependent upon on others, indication of which rendering nodes/rendering algorithms can share system resources, indication of which rendering nodes/rendering algorithms can be executed at the same time. System barriers can also be explicit commands issued to, or to be issued to, a processor, e.g. a GPU. An example of a system barrier is a command that everything which comes in before the barrier must finish before the next set of processes starts. Semaphores can be a system barrier.

By 'at the same time' it is generally meant that at a given time during rendering two or more distinct processes, e.g. render nodes and/or rendering algorithms, can be active. They may be running simultaneously where they both start and/or finish at the same time. However, they also may be merely overlapping and where the two processes running at the same time can start and stop independently.

An acyclic graph can be created where the nodes of the acyclic graph are rendering algorithms and/or render nodes within a pipeline. For example, all of the work needed to be done by a GPU can be represented as nodes in an acyclic graph. Within an acyclic graph, the edges/links between the nodes of the acyclic graph can be the respective inputs and outputs of the rendering algorithms and/or render nodes. As discussed herein, an acyclic graph is typically a directed acyclic graph.

Figure 1:
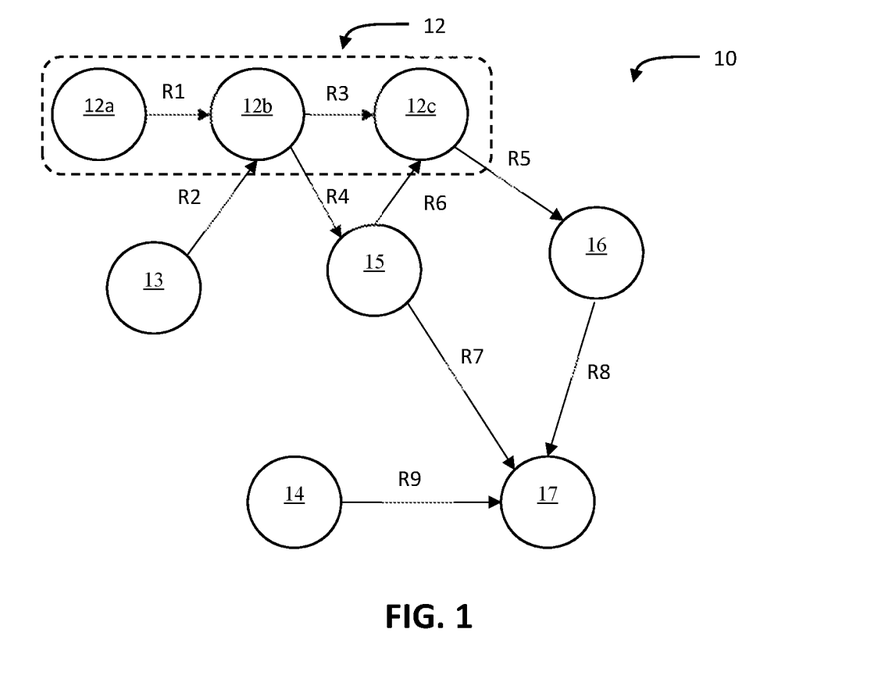
FIG. 1 shows an example acyclic graph of render nodes.

An example directed acyclic graph 10 of a simple render pipeline is shown in FIG. 1. The acyclic graph 10 includes a plurality of render nodes 12a-12c & 13-17. Each render node is a process which has defined inputs and outputs R1-R9. As shown in the example, there can be a render algorithm 12 which is composed of a series of render nodes 12a, 12b and 12c. The render algorithm can be subdivided as such based on the sub processes having different input and output requirements.

As can be seen from the graph 10, render node 12a outputs resource R1 which is an input for render node 12b. Render node 12b also requires the output R2 of render node 13. Render node 12b then outputs resources R3 and R4 which are inputs to render nodes 12c and 15 respectively. Resources R3 and R4 can be the same information and simply shown as two edges in the acyclic graph 10 as, while the information is the same, there are two distinct inputs. As well, the process of render node 12b can create two separate sets of data at the same time which are distinct outputs and distinct inputs.

Render nodes 13 and 15 for example can be essentially the same process and simply two distinct passes of that same process. Since the two passes of the same process will have different inputs and outputs, as seen from the graph, they can therefore be considered as separate render nodes within the render pipeline.

As can be seen from the directed graph, render nodes 12a-16 feed into final node 17 which is then capable of rendering the completed image. A more concrete example of a render pipeline with defined render nodes is described below. However, any render pipeline can be described as these render nodes having distinct inputs and outputs. With this information the pipeline can be assembled into a similar acyclic graph.

An order of a rendering pipeline, e.g. a high level rendering pipeline, can be set based on an acyclic graph of the units. The units of the high level rendering pipeline can be render nodes, rendering algorithms of a combination thereof. The order can be set, for example, by carrying out a topological sort function on the acyclic graph. The outcome can then be an ordered single list of work units to be executed during rendering. Additionally, this list of work units can include the work units which can be carried out at the same time and/or information on which work units can be carried out at the same time. Such information can include information on which work units do not depend on, or need information from, certain others. Similarly, such information can include information on which work units require the same, or similar, resources.

Furthermore, based on the edges/links of an acyclic graph a set of system resource barriers can be defined. These barriers or information regarding these barriers can be stored within a rendering pipeline and/or can be accessible thereto. Therefore, these system resource barriers can be issued prior to, or during execution of a rendering pipeline to which they relate.

A liveness analysis can also be carried out based on an acyclic graph. From the liveness analysis memory allocation and/or memory cache flushing for an associated rendering pipeline can be determined. The memory allocation and/or memory cache flushing can thus be determined based on the resources described by the edges/links of the acyclic graph. Similarly, the memory allocation and/or memory cache flushing can thus be determined based on the inputs and outputs of render nodes and rendering algorithms. Therefore, memory can be allocated to a render node or rendering algorithm for only as long as needed while being executed.

The memory allocation and/or memory cache flushing, or information regarding that, can be stored within a rendering pipeline and/or can be accessible thereto. Therefore, memory can be partitioned, allocated and/or flushed prior to, or during execution of a rendering pipeline to which they relate.

Render nodes can be created separately from a broader rendering algorithm. For example, a high level rendering pipeline can contain a set of generic rendering algorithms, e.g. shadow map generation rendering algorithm, light data calculation rendering algorithm, opaque object rendering algorithm, etc. A user can then define one or more unique and/or additional render nodes. An example of a render node can be a specific glow around a certain object or object type. A render node can be considered as a specific work unit. A render node can also be considered to be defined by its inputs and outputs. For example, an orb glow render node can have the orb glow data for an object as its output and can have as its input light data, object position/orientation data and object surface texture data.

A render node defined by its inputs and outputs can be easily created by a user without detailed knowledge of a larger rendering pipeline or how the render node fits in. However, with defined inputs and outputs the render node can easily be added to an acyclic graph, for example an existing acyclic graph, and then sorted and integrated seamlessly within a rendering pipeline.

Additionally, a render node can be one pass of a rendering algorithm. A render node can also be several linked passes of one or more rendering algorithms. A render node can also be or include a rendering routine. For example, the sub-work unit takes a set of inputs, runs it through a routine, and produces an output. The routine can be simple or complex and can be predetermined or dynamic.

According to certain examples, information relating to memory requirements can be stored in and/or accessible to a lower level rendering pipeline. Thus, as an example, a high level rendering pipeline can define the order of work units (render nodes and/or rendering algorithms) to be carried out during rendering and a lower level pipeline can go through a rendering graph to determine minimal state transitions and associated memory requirements. Furthermore, as an example, a lower level rendering pipeline can determine to use more memory than minimally required in order to run multiple work units or render nodes at the same time. The information on which work units and/or render nodes can be run at the same time can be stored in and/or accessible to either of the high or low level rendering pipelines.

Additionally, while there is described herein a high/higher level rendering pipeline and a low/lower level rendering pipeline, any feature herein described in one level can be moved and/or copied to the other level. Furthermore, all of the features described herein can be combined into a single level rendering pipeline or dispersed in to one or more third rendering pipelines. Similarly, what is described herein as a high level rendering pipeline can be swapped into and/or simply be considered a low level rendering pipeline and vice versa.

The methods described herein can be run in real time or can be carried out prior to rendering. For example, the content and/or order of rendering pipelines, system resource barriers, memory allocation information or a combination thereof can be predetermined. During an execution of a program for displaying an image on a display device, the program/graphics engine can simply be issued or access the predetermined information and then carry out the final rendering.

As an example, a simple rendering pipeline can include a shadow map generation render node, light data calculation render node, opaque objects rendering algorithm, transparent objects rendering algorithm, tonemapping render node and depth of field rendering algorithm. From an acyclic graph it can be determined that the opaque objects rendering algorithm and transparent object rendering algorithm each require shadow map data output from the shadow map generation render node and light data from the light data calculation render node.

Since light data and shadow map generation do not depend on each other, a graphics engine or GPU can schedule this work, e.g. these two render nodes, to run in parallel, e.g. at the same time. Furthermore, the graphics engine can make sure these render nodes are completed before an opaque pass render node is scheduled from the opaque objects rendering algorithm. The system resource barriers here can be the order, or information on the order, of the render nodes to be executed and their associated CPU/GPU requirements for each.

As the transparent objects rendering algorithm depends on both shadow map data, light data and an opaque pass output as inputs, so the graphics engine can schedule the transparent objects rendering algorithm to execute after a required opaque pass render node is finished.

Following this can be scheduled tonemapping and depth of field. If the tonemapping render node requires intermediate textures (e.g. downsample of the scene) as an input and the depth of field rendering algorithm also needs the intermediate textures, the scheduler can opt to share the same memory to be used by the tonemapping render node and the depth of field rendering algorithm. If necessary, the scheduler can also issue correct barriers between them. For example, instead of issuing a command to flush a memory cache of the intermediate textures after a tonemapping render node pass, a depth of field render node pass can be scheduled at a similar time, use the same cached intermediate texture data and only thereafter is an instruction for the intermediate texture data to be flushed from the memory cache.

Furthermore, the depth of field rendering algorithm might only need depth for an internal circle of confusion calculation render node. However, in a later render node the depth of field rendering algorithm needs the tonemapping output. Therefore, the scheduler can execute the tonemapping render node and circle of confusion calculation render node to be run in parallel. Therefore, these render nodes can be run at the same time even though a tonemapping rendering algorithm and a depth of field rendering algorithm as wholes could not be run at the same time.

Figure 2:
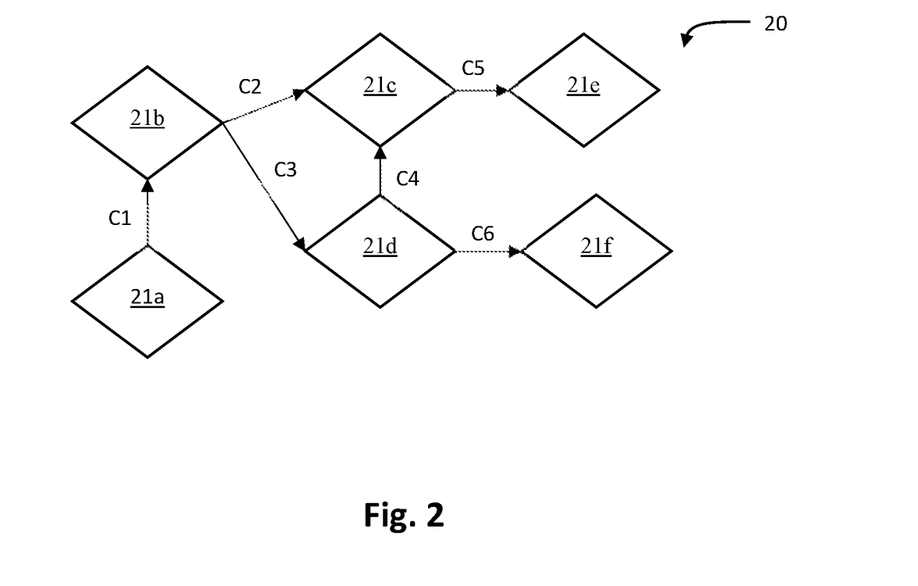
FIG. 2 shows an example acyclic graph of compute nodes.

In addition to rendering, a GPU typically deals with some computational work load. While computing work load can be resource intensive, the order in which computational work is handled may be less complex than the rendering work outlined above, though this is of course not always the case. In order to schedule computational work within the GPU each computational process or work load can be described as a node in a computational acyclic graph. FIG. 2 is an example of such a graph.

FIG. 2 shows an example computational acyclic graph 20 with compute nodes 21a-21f These compute nodes are connected by their calculated data C1-C6 as shown in the graph. The construction of an acyclic graph for compute nodes can therefore be achieved in the same manner as with the rendering acyclic graph 10 as described above. Compute nodes can be essentially any computational work unit which a GPU needs to process.

Typically within the GPU however there are both rendering processes and computing processes which either need to run at the same time or are otherwise fighting for the same resources. Therefore, there exists a need to manage the work load balance of both the rendering and compute processing.

Figure 3:
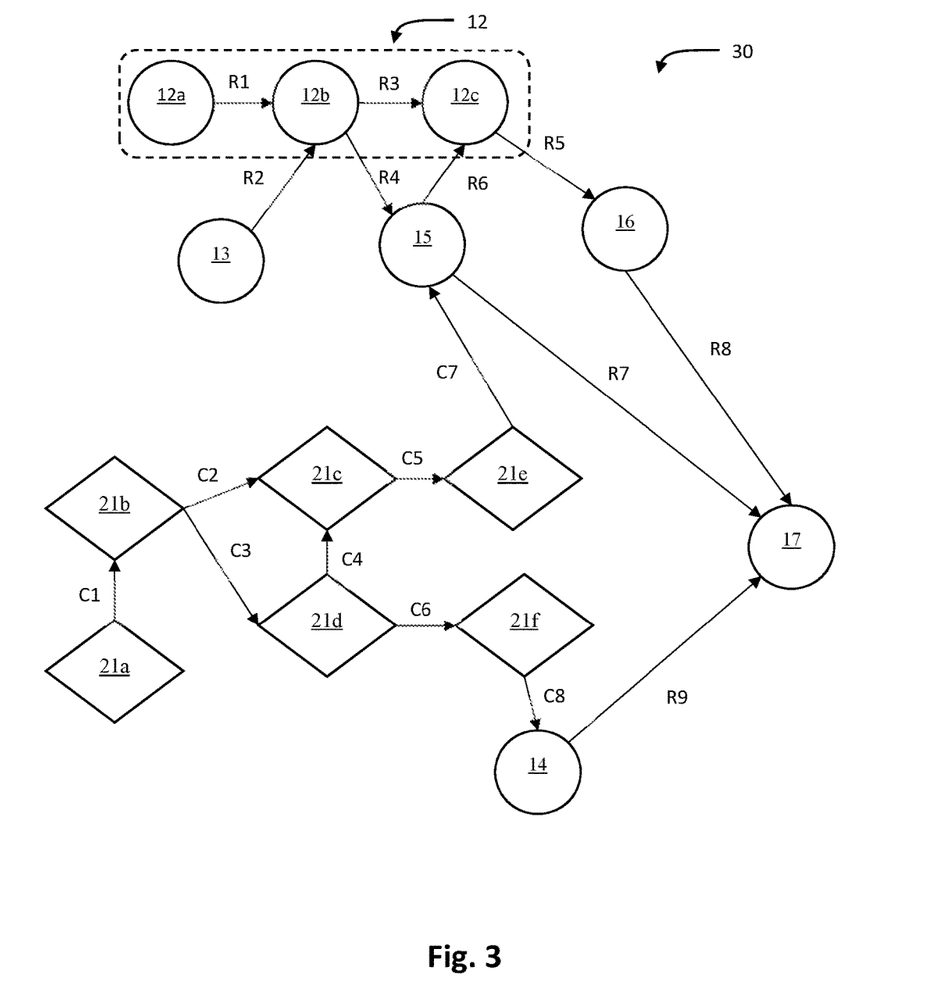
FIG. 3 shows a combined graph of render and compute nodes with real links.
Figure 4:
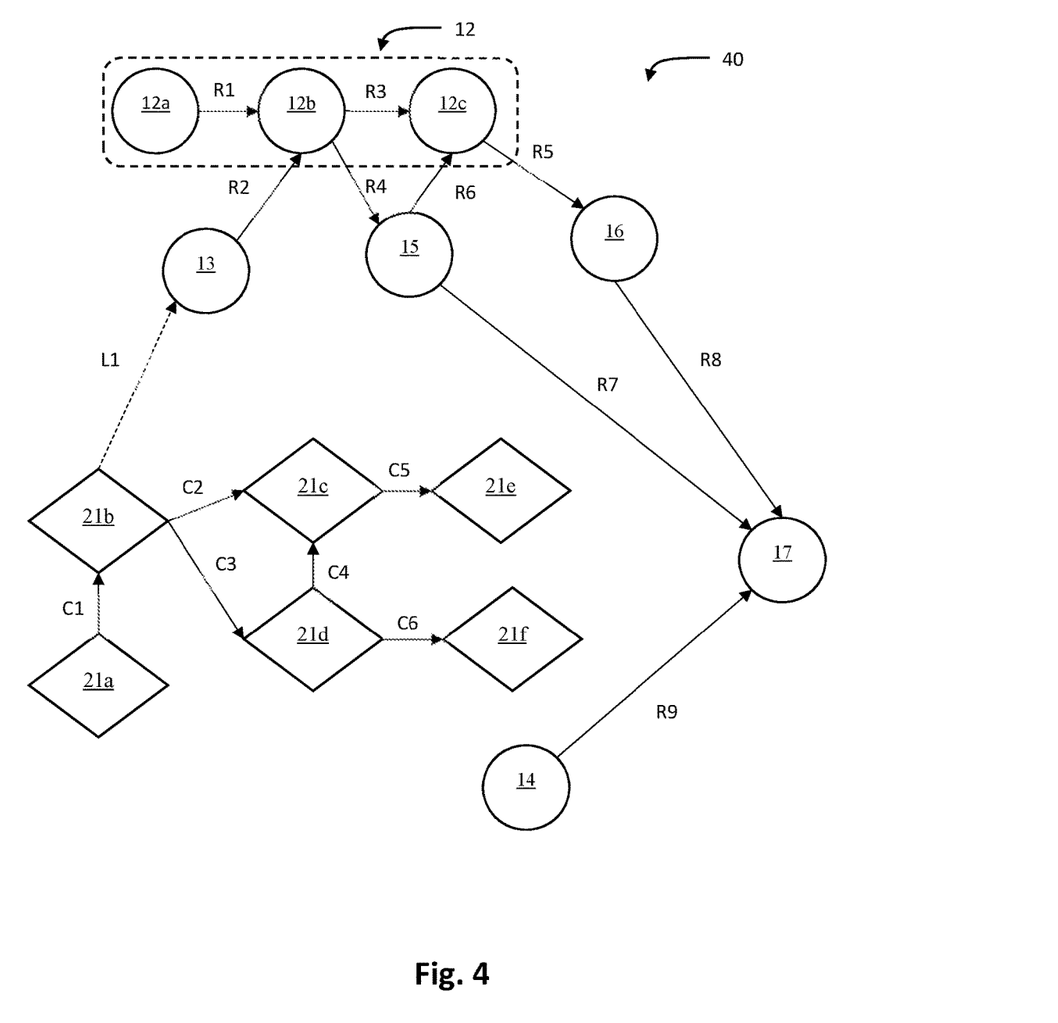
FIG. 4 shows a combined graph of render and compute nodes with an arbitrary link.

While FIG. 1 shows a rendering acyclic graph with render nodes and FIG. 2 shows a compute acyclic graph with compute nodes, a hybrid graph can be constructed as shown in FIGS. 3 and 4. The benefits of a hybrid graph are that one compile process of a hybrid graph can achieve a single schedule and set of system barriers which take in all of the required processes for the GPU. With such a single schedule and single set of system barriers there is no fighting for system resources and the allocation method can therefore manage all of the required processes of the GPU as efficiently as possible.

FIG. 3 shows an example of a hybrid graph. In a hybrid graph the nodes can be considered work nodes which can be any work that the GPU needs to carry out. The work nodes can be render nodes, e.g. 12a-17, work nodes can be compute nodes, e.g. 21a-21f, or they can be any other type of nodes which represent other processes to be carried out by a host device.

Compute nodes can produce outputs which are used in render nodes, and vice versa. For example, compute node 21e can output computation data C7 which is used as one of several inputs for render node 15. Similarly, as shown in the example, render node 14 uses output C8 from compute node 21f. As such, these compute nodes, and the compute nodes connected thereto, can be connected within the hybrid graph by the real input/output connections between certain compute and render node pairs.

While FIG. 3 shows the connection of one render node set and one compute node set, a hybrid graph can contain a plurality of different inter related work node sets. A hybrid graph does not need to be a combination of more than one graph as it can be an original graph which simply has work nodes which contain both render nodes and other nodes, such as compute nodes, which are somehow inter related.

Additionally, there are times when two separate sets of nodes are not interrelated but still require resources from the same host device. Regularly, these two sets of processes would fight for the same resources or would otherwise need some partitioning of system resources. However, by creating multiple acyclic graphs which are not interrelated and then creating an arbitrary connection, then a single compile process can be carried out such that all of the processes can be scheduled and carried out collaboratively.

FIG. 4 shows an example where the render graph of FIG. 1 and the compute graph of FIG. 2 are not interconnected via a required input/output pair of nodes, as was shown in FIG. 3. In FIG. 4 an arbitrary connection L1 is made between compute node 21b and render node 15. An arbitrary connection can be made between any two nodes between multiple graphs. The arbitrary connection can be made at a certain point in order to preference one set of nodes over another or at a spot in which a desired amount of flexibility is achieved.

The arbitrary connection allows for a compile process, e.g. a topological sorting, of the hybrid acyclic graph to create a single schedule list and set of resource barriers for all of the work of the GPU. Having several unrelated graphs would likely result in a set of compile processes having a set of schedule lists and resource barriers. It would then require some additional hierarchy or general resource partitioning in order to prevent multiple processes from trying to access the same system resources at the same time.

Once two graphs are linked, either by real or arbitrary connections, then a compile process can be carried out in accordance with that described with respect to the rendering acyclic graph.

According to certain scenarios, two graphs/sets of work nodes may be combined for only part of the time. For example, in the case of FIG. 4, the compute graph of FIG. 2 may only need to run for a short time periodically on a host device. When it is not necessary that the compute graph of compute nodes 21a-21f are run then the arbitrary connection L1 can be removed and the remaining acyclic graph can be re-compiled. In this way, unnecessary work nodes, and the resources they require, can be taken out of a scheduling queue which increases the efficiency of use of system resources. This re-compiling may happen every frame or it may happen periodically after some set of frames and/or time.

Figure 5:
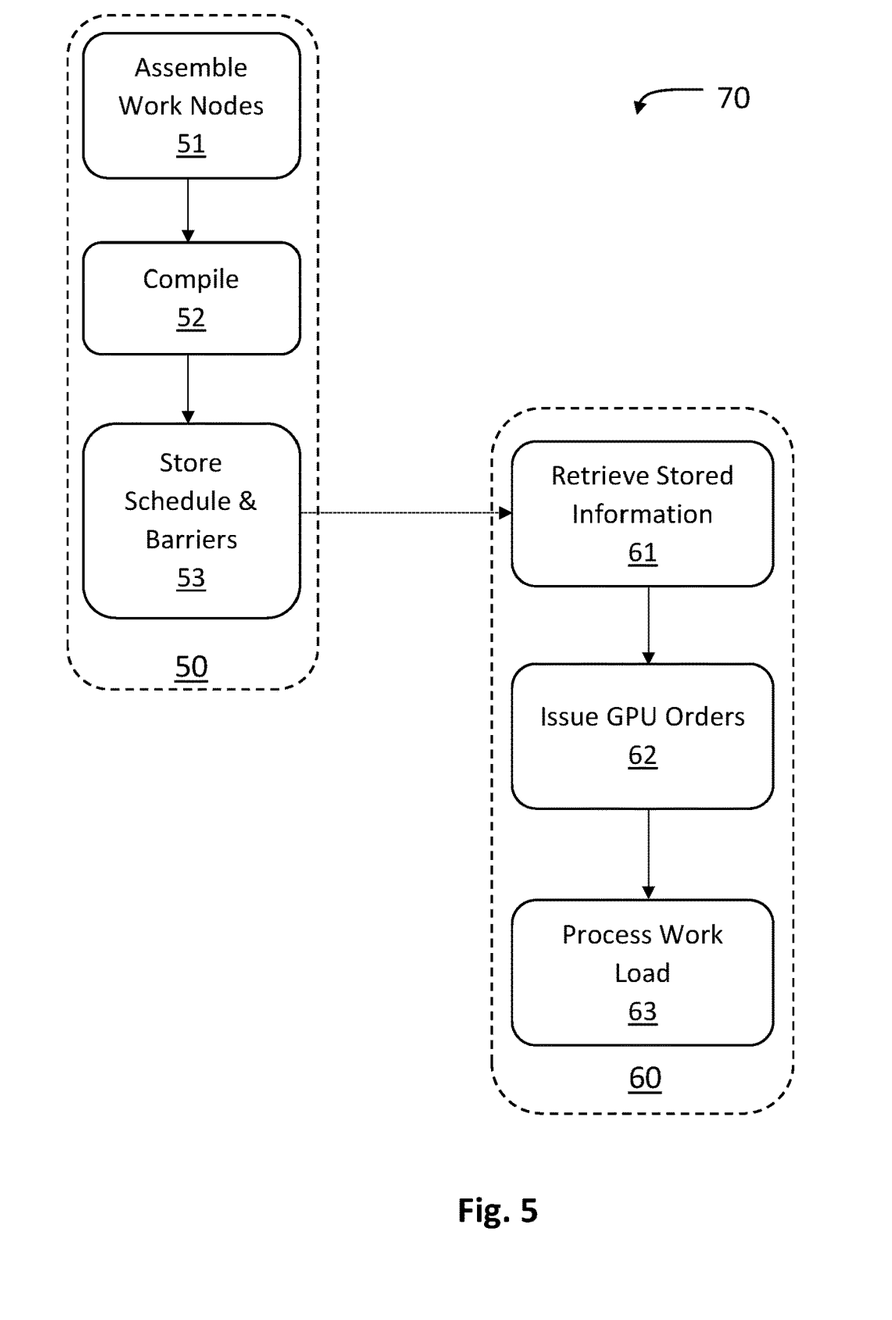
FIG. 5 shows an example resource allocation method.

FIG. 5 shows an example high level method 70 which implements the principles described herein. The high level method 70 can include two separate methods 50 and 60. Method 50 as shown can be considered as a pre-processing stage. However, Method 50 can also be carried out in real-time or near real-time.

Method 50 can be carried out, for example, in pre-processing on a first device, host device or display device. Method 60 can be for example a rendering method on a display device. Method 60, for example, can be carried out on a display device having an embedded graphics engine. As such, methods 50 and 60 can be carried out on independent devices or on the same device. Additionally, steps within the two methods, or the two methods themselves, can run sequentially or in parallel. Additionally, for example method 50 can be run once on a first device and then method 60 can be run later on multiple different display devices.

Method 50 describes a method for collaboratively allocating resources of a host device and/or GPU. The method includes assembling 51 a plurality of work nodes. The work nodes can have their defined input(s) and output(s). Additionally, the work nodes may include one or more arbitrary link. Said work nodes can be render nodes, compute nodes or other work processes for a GPU/host device.

From the assembled set of work nodes a schedule can be compiled 52. The compiled schedule for the plurality of work nodes can be based at least on the defined input(s), output(s) and arbitrary links. Additionally, the plurality of work nodes can be scheduled such that more than one process or sub process can be carried out at a point in time. For example, the schedule can include rendering nodes and compute nodes running at the same time. Within the compiling, a set of resource barriers can be defined. The set of resource barriers can include system resource barriers. These system resource barriers can be for processing the set of work nodes based on the created schedule.

The schedule and/or barriers can then be stored 53 in a memory of an electronic device. These can be stored prior to executing a process in a host devcie or on a GPU, such as rendering, e.g. prior to carrying out the associated method 60 on a display device.

The information from method 50 can then be retrieved by a working and/or rendering process 60. Once the rendering/work process 60 is initiated, then based on the schedule and/or barriers orders can be issued 62 to a host device. The host device can be, or can include, a graphics processing unit (GPU). The host device can also be, or can include a central processing unit (CPU) or other whole or portion of a processing unit. Once the orders are carried out by the host device then a desired image is rendered 63 or the work is processed.

Method 50, 60 or 70 can include creating a high level work pipeline and a lower level work pipeline. The high level work pipeline can include said assembly 51 of work nodes and their dependencies. The lower level work pipeline can include the compiling 52 and created/stored schedule and barriers. The lower level pipeline can include determining minimal state transitions and/or memory requirements for each of the work nodes. Furthermore, the lower level pipeline can include the explicit orders and/or issuing 62 the explicit orders.

Essentially, the lower level pipeline can handle the actual resource allocation for the GPU/host device. The high level work pipeline can thus contain the information about the processes and dependencies which require the resource allocation. For example, the high level pipeline can define a chain of the work nodes which is capable of producing a desired rendered image, set of images or data output. The lower level pipeline can, among other things, then determine how many work nodes can be run parallel at the same time at a given point in time.

Creating a schedule and/or compiling can include creating the directed acyclic graph of the work nodes, their inputs and their respective outputs and any arbitrary links. Within the acyclic graph, the nodes can be render nodes, render algorithms, compute nodes or other work processes for a GPU/host device. The edges between the nodes in the acyclic graph can be the dependencies, real or arbitrary, between the render nodes based on the inputs and outputs of the work nodes.

Method 50 can further comprise, for example within compile step 52, topologically sorting an acyclic graph into a single list. The single list can be an order of work nodes which can be executed. An order can include dependencies between different render nodes including which render nodes or sets of render nodes can be executed independently of others. An arbitrary link can designate to the scheduler that the node or chain of nodes can be executed independently of one or more other nodes or chains of nodes which have no real links between them in their respective chains.

System resource barriers can be defined based off of the edges from the acyclic graph, for example within compile step 52. A defined set of system resources can include host device (e.g. CPU or GPU) resource requirements and/or allocation. For example, memory can be allocated for a work node for only the required amount of time for the work node. Rendering resources necessary as input for one render node can be kept in a memory cache and re-used for another render node. Additionally, for example when a resource is read-only, multiple work nodes utilizing the same or similar resources and which are independent can be scheduled near each other to utilize the cached resource.

Memory cache flushing instructions can be issued 62 for cached resources from the set of system resource barriers are issued, or scheduled to be issued, after the last work node which needs the same or similar resource has output its product. Memory can be allocated and/or memory cache flushing instructions can be created based on a liveness analysis of the edges of an acyclic graph of the work nodes of a rendering pipeline. One example herein is graph coloring.

A benefit which arises from the present methods are that a user can define a process independently outside of a rendering engine/graphics engine. The process and/or calculation can then be set as a work node with resources which it needs to run. The work node can then be added to an existing pipeline and/or set of work nodes. The work node can be added by a real connection if its input and/or output are found or used in the existing pipeline or an arbitrary connection can be added. The arbitrary connection can be added to a predetermined location, in a predetermined manner, in a selected manner or in an arbitrary manner.

The new set of work nodes with the additional work node can then be re-compiled. In this manner, a developer can easily add, modify and remove small processes or sets of processes from a larger pipeline without needing to explicitly know themselves how those changes will affect the overall resource allocation of the process. Therefore, a method 50 can further include defining a new work node, its required inputs and its required outputs, any necessary arbitrary connections and adding the new work node to an existing pipeline. The new work node can be added by adding the new work node to an acyclic graph of the existing pipeline based on its required inputs and outputs and re-compiling to create a new schedule and set of system resource barriers based on the new set of nodes.

As such, a high level pipeline can combine both render nodes and compute nodes. A low level pipeline can then allocated GPU resources from the same pool to both compute nodes and render nodes based on the priority of each or based on another parameter which, for example, allows for a more efficient use of resources. For example, when a lag will be created if a certain render process is delayed, then a low level pipeline can allocate resources as soon as possible to that process and delay other unrelated and less critical processes. According to certain examples, the low level pipeline may also be able to push certain non-rendering related tasks to another processing unit and/or device if there are not enough free resources in the GPU at a given time for both the rendering processes and compute processes. A result of these hybrid graphs and scheduling is a balancing of system resources.

Additionally, there can be an electronic device including a graphics processing unit (GPU), an electronic display associated with the GPU, an embedded graphics engine having a set of rendering algorithms for being carried out on the GPU to produce an image on the electronic display, and a non-transitory computer readable medium having stored thereon a set of predefined system resource barriers capable of being assigned to the GPU and a predefined scheduled order of the rendering algorithms for processing.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

We claim:

1. A method for allocating resources of a graphics processing unit (GPU) comprising the computer implemented steps of:
   assembling a plurality of work nodes having defined inputs and outputs, wherein at least one work node is a rendering work node and at least one work node is a compute work node,
   creating a schedule for the plurality of work nodes based at least on the defined inputs and outputs, wherein the plurality of work nodes are scheduled such that more than one GPU process can be carried out at a point in time,
   defining a set of system resource barriers for processing the set of work nodes based on the created schedule, wherein both render nodes and compute nodes are capable of using a same set of GPU resources,
   creating a high level pipeline, wherein the high level pipeline includes the assembly of work nodes and dependencies of the inputs and outputs requiring resource allocation, and
   creating a lower level pipeline, wherein the lower level pipeline includes creating the schedule and defined set of system resource barriers, and wherein the lower level pipeline is configured to handle the resource allocation.

2. The method of claim 1, wherein the defined set of system resource barriers and the created schedule are stored in a computer readable medium prior to rendering.

3. The method of claim 1, wherein the lower level pipeline further includes determining minimal state transitions and/or memory requirements for each of the work nodes.

4. The method of claim 3, wherein the high level pipeline includes a chain of rendering nodes which is capable of producing a desired rendered image or set of images.

5. The method of claim 1, wherein creating the schedule includes creating a directed acyclic graph of the work nodes, their inputs and their respective outputs.

6. The method of claim 5, wherein within the acyclic graph, the nodes are work nodes and the edges between the nodes in the acyclic graph are dependencies between the render nodes based on the inputs and outputs of the nodes.

7. The method of claim 5, further comprising topologically sorting the acyclic graph into a single list which is an order of render nodes which can be executed.

8. The method of claim 5, wherein at least two work nodes are connected in the acyclic graph by only an arbitrary link.

9. The method of claim 8, wherein the arbitrary link is not a real input or output of either of the two work nodes that it connects.

10. The method of claim 5, wherein the system resource barriers are defined based off of the edges from the acyclic graph.

11. The method of claim 1, wherein two unrelated sets of work nodes are combined into a single set of work nodes by an arbitrary link between at least two of the unrelated work nodes.

12. The method of claim 1, wherein each work node is a routine and/or a piece of work which is to be performed by the GPU.

13. The method of claim 1, further comprising defining a new work node, its required inputs and its required outputs, and adding the new work node to an existing pipeline.

14. The method of claim 13, wherein the new work node is added by adding the new work node to an acyclic graph of the existing pipeline by adding an arbitrary link to an unrelated work node in the existing pipeline.

15. The method of claim 1, wherein the defined set of system resource barriers includes memory cache flushing instructions and/or memory allocation.

16. The method of claim 15, wherein the memory is allocated and/or memory cache flushing instructions are based on a liveness analysis of the edges of an acyclic graph of the work nodes of a work pipeline.

17. A method for rendering an image on an electronic display device and carrying out compute processes on a graphics processing unit (GPU) comprising computer implemented steps of:
   receiving a set of system resource barriers for the GPU associated with the electronic display device,
   receiving a scheduled order of a set of work nodes to be processes by the GPU, wherein the set of work nodes includes both rendering nodes and compute nodes, and wherein at least some of the work nodes can be processed by the GPU at the same time, and
   rendering an image on the electronic display device and carrying out computations by carrying out the work nodes in accordance with the received schedule using assigned system resources of the GPU based on the set of received system resource barriers,
   wherein both render nodes and compute nodes are capable of using a same set of GPU resources,
   wherein a high level pipeline includes an assembly of the work nodes and dependencies of the inputs and outputs requiring resource allocation, and
   wherein a lower level pipeline includes the scheduled order and the set of system resource barriers, and wherein the lower level pipeline is configured to handle the resource allocation.

* * * * *